United States Patent
Sano (10) Patent No.: US 6,409,624 B1
(45) Date of Patent: Jun. 25, 2002

(54) HYDRAULIC CONTROL SYSTEM OF AUTOMOTIVE AUTOMATIC TRANSMISSION

(75) Inventor: Takashi Sano, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/599,548

(22) Filed: Jun. 23, 2000

(30) Foreign Application Priority Data

Jun. 29, 1999 (JP) ............................................ 11-183836

(51) Int. Cl.$^7$ ............................................... F16H 31/00
(52) U.S. Cl. ........................ 475/116; 475/120; 475/125
(58) Field of Search ................................. 475/116, 118, 475/120, 121, 122, 123, 125

(56) References Cited

U.S. PATENT DOCUMENTS

| | | | | |
|---|---|---|---|---|
| 4,538,482 A | * | 9/1985 | Hiramatsu | .................... 74/869 |
| 4,936,166 A | * | 6/1990 | Holbrook et al. | .......... 74/733.1 |
| 4,996,894 A | * | 3/1991 | Holbrook et al. | ............. 74/885 |
| 5,950,787 A | | 9/1999 | Murasugi et al. | ....... 192/85 AA |
| 5,957,260 A | | 9/1999 | Kunii | ....................... 192/85 R |

FOREIGN PATENT DOCUMENTS

| JP | 10-103381 | 4/1998 |
|---|---|---|
| JP | 10-159960 | 6/1998 |

* cited by examiner

*Primary Examiner*—Sherry Estremsky
*Assistant Examiner*—Tisha D. Lewis
(74) *Attorney, Agent, or Firm*—Foley & Lardner

(57) ABSTRACT

An automatic transmission has a low clutch that assumes its engaged condition at a plurality of lower gear positions of D-range and a high clutch that assumes its engaged condition at a plurality of higher gear positions of D-range, A hydraulic control system for the transmission comprises a hydraulic section that produces a line pressure; a solenoid valve that produces a solenoid pressure upon receiving a solenoid signal; a first pressure control valve that produces a first output pressure from the line pressure by using the solenoid pressure and the first output pressure as operation signal pressures, the first output pressure having a smaller gain with respect to the solenoid pressure; a second pressure control valve that produces a second output pressure from the line pressure by using the solenoid pressure and the second output pressure as operation signal pressures, the second output pressure having a larger gain with respect to the solenoid pressure; and a switching valve that selectively assumes a first position to feed the low clutch with the first output pressure when the engagement of said low clutch brings about a higher gear position that needs a smaller torque contribution, and a second position to feed the low clutch with the second output pressure when the engagement of low clutch brings about a lower gear position that needs a larger torque contribution. The switching movement of the switching valve is effected by a high clutch pressure applied to the high clutch.

6 Claims, 8 Drawing Sheets

|  | L/C | H/C | R/C | 2-4B | L&R/B |
|---|---|---|---|---|---|
| R-RANGE |  |  | ○ |  | ○ |
| 1 - GEAR | ○ |  |  |  | (○) |
| 2 - GEAR | ○ |  |  | ○ |  |
| 3 - GEAR | ○ | ○ |  |  |  |
| 4 - GEAR |  | ○ |  | ○ |  |

HYDRAULIC CONTROL SYSTEM OF AUTOMOTIVE AUTOMATIC TRANSMISSION

BACKGROUND OF THE INVENTION

1. Field of the Invention

The present invention relates to automotive automatic transmissions of an engaging pressure electronically controlled type (which will be referred to EPEC hereinafter for ease of description) wherein the hydraulic pressure needed by each frictionally engaging element is directly controlled by an electronic control means, and more particularly to a hydraulic control system of such type automotive automatic transmissions.

2. Description of the Prior Art

In order to clarify the task of the present invention, two prior art hydraulic control systems of an automotive automatic transmission will be briefly described with reference to attached drawings.

Figure 9:
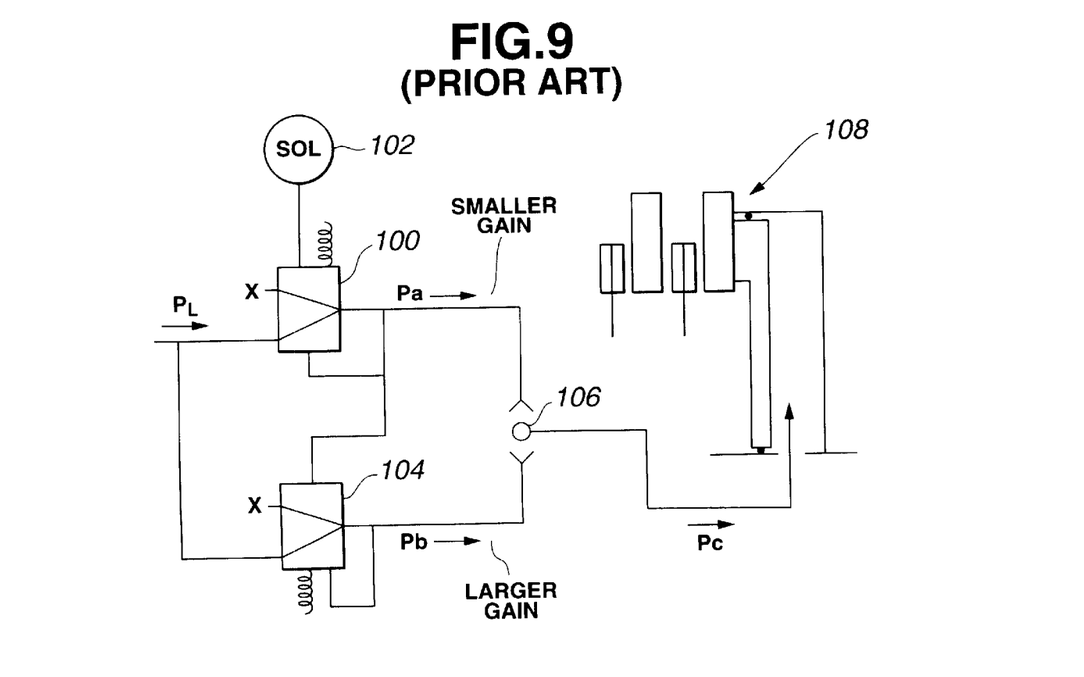
FIG. 9 is a schematic drawing of a conventional hydraulic control system of an automotive automatic transmission.
Figure 10:
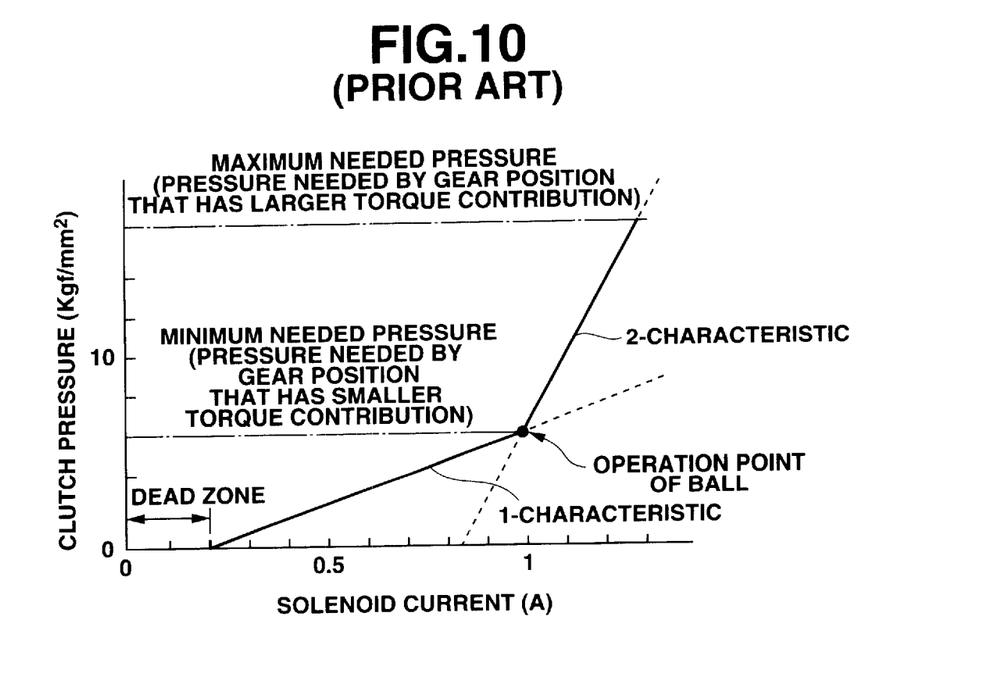
FIG. 10 is a graph showing a characteristic of a clutch pressure created by the conventional hydraulic control system of FIG. 9.

One is the hydraulic control system disclosed by Japanese Patent First Provisional Publication 10-159960, which employs two pressure control valves for changing the gain of hydraulic pressure applied to a clutch. As is seen from FIG. 9 of the accompanying drawings, the system comprises a main pressure control valve 100 which is actuated by a solenoid 102 and a sub-pressure control valve 104 which is actuated in accordance with an output pressure of the main control valve 100. Between output passages of these two control valves 100 and 104, there is arranged a ball valve 106. From the ball valve 106, there extends a passage to a frictionally engaging element, that is, clutch 108. The ball valve 106 is so arranged that when the output pressure of the main control valve 110 is higher than that of the sub-control valve 104, the output pressure of the main control valve 100 that has a smaller gain is applied to the clutch 108, while when the output pressure of the sub-control valve 104 is higher than that of the main control valve 100, the output pressure of the sub-control valve 104 that has a larger gain is applied to the clutch 108. With this arrangement, the system of the publication exhibits such a hydraulic pressure characteristic as shown in FIG. 10.

However, the system of the publication tends to have the following drawback due to its inherent construction. That is, as is indicated by the characteristic line part indicated by "2-characteristic", in a second zone, that is, the zone between a point where the characteristic of the hydraulic pressure changes from "1-characteristic" to "2-characteristic" and a point where a maximum hydraulic pressure is needed, it is desirable to moderate the gain of the hydraulic pressure by a certain degree to obtain a satisfied clutch pressure irrespective of the unstable actuation by the solenoid 102. However, in practice, there is a need of reducing the size of the solenoid 102 by a certain degree due to inevitable constraint by cost and mounting space. As is known, reduction in size of the solenoid 102 brings about a constrain on the electric current zone of the solenoid 102. Accordingly, in order to obtain a maximum hydraulic pressure needed by the clutch at the constrained electric current zone, it is inevitably necessary to increase the gain of the hydraulic pressure of the clutch relative to the current applied to the solenoid 102. By this reason, at a gear change to a gear position that needs a larger torque contribution in the second zone, a satisfactorily fine pressure control to the clutch has not been obtained.

Figure 11:
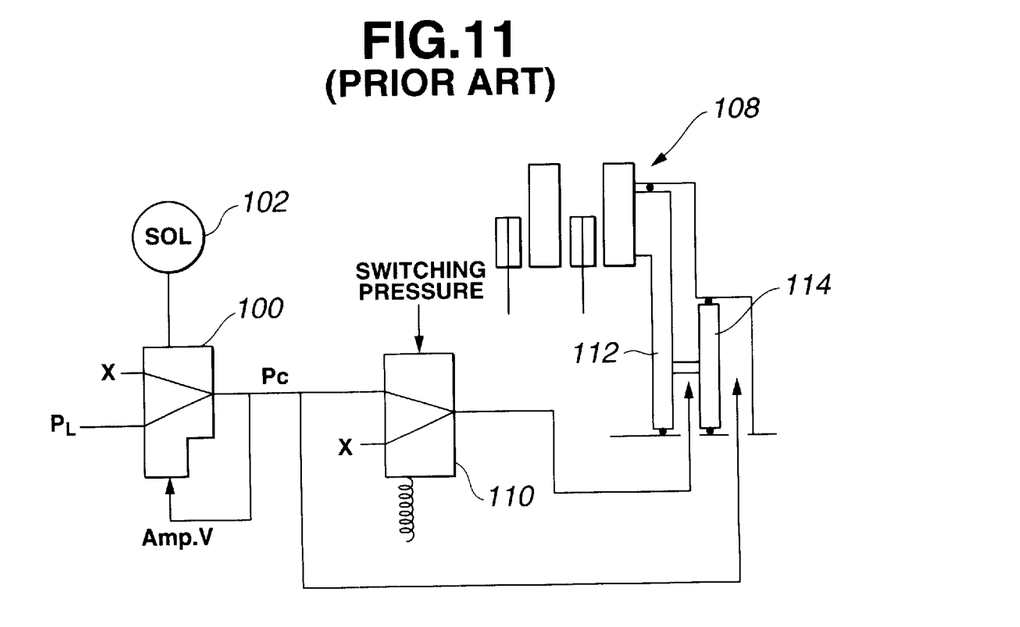
FIG. 11 is a view similar to FIG. 9, but showing another conventional hydraulic control system of an automotive automatic transmission.

The other hydraulic control system is disclosed by Japanese Patent First Provisional Publication 10-103381, that is shown in FIG. 11 of the accompanying drawings. In this system, a switch valve 110 is arranged in the passage between the pressure control valve 100 and the clutch 108, and two clutch pistons 112 and 114 are associated with the clutch 108, as shown. With this arrangement, the system is so operated that in a lower gear position that needs a larger torque contribution, a higher torque capacity is obtained, while in a higher gear position that needs only a smaller torque contribution, a lower torque capacity is obtained. However, due to the nature of the arrangement wherein the engaging torque capacity of the clutch is changed by the two clutch pistons 112 and 114, that is, by using a so-called piston pressure receiving area switching mechanism, a fine control of the hydraulic pressure at the time of gear change has not been obtained. Furthermore, due to usage of the two clutch pistons 112 and 114, the entire length of an associated transmission becomes longer and the number of parts used is increased inevitably.

SUMMARY OF THE INVENTION

It is therefore an object of the present invention to provide a hydraulic control system of an automotive automatic transmission, which is free of the above-mentioned drawbacks.

That is, in accordance with the present invention, there is provided a hydraulic control system of an automotive automatic transmission, that can suitably set the torque capacity for the frictionally engaging element in accordance with a torque contribution needed by the engaging element when performing a given gear position and can finely control the hydraulic pressure applied to the engaging element.

According to a first aspect of the present invention, there is provided a hydraulic control system for use in an automatic transmission having a frictionally engaging element that is hydraulically actuated for assuming a plurality of gear positions. The hydraulic control system comprises a first hydraulic section that produces a line pressure; a solenoid valve that produces a solenoid pressure upon receiving a solenoid signal; a first pressure control valve that produces a first output pressure from the line pressure by using the solenoid pressure and the first output pressure as operation signal pressures, the first output pressure having a smaller gain with respect to the solenoid pressure; a second pressure control valve that produces a second output pressure from the line pressure by using the solenoid pressure and the second output pressure as operation signal pressures, the second output pressure having a larger gain with respect to the solenoid pressure; and a switching valve that selectively assumes a first position to feed the engaging element with the first output pressure when the engagement of the engaging element brings about a higher gear position that needs a smaller torque contribution, and a second position to feed the engaging element with the second output pressure when the engagement of the engaging element brings about a lower gear position that needs a larger torque contribution.

According to a second aspect of the present invention, there is provided a hydraulic control system for use in an automatic transmission having a low clutch that assumes its engaged condition at a plurality of lower gear positions of D-range and a high clutch that assumes its engaged condition at a plurality of higher gear positions of D-range. The hydraulic control system comprises a first hydraulic section that produces a line pressure; a solenoid valve that produces a solenoid pressure upon receiving a solenoid signal; a first pressure control valve that produces a first output pressure from the line pressure by using the solenoid pressure and the first output pressure as operation signal pressures, the first output pressure having a smaller gain with respect to the solenoid pressure; a second pressure control valve that produces a second output pressure from the line pressure by using the solenoid pressure and the second output pressure as operation signal pressures, the second output pressure having a larger gain with respect to the solenoid pressure; a switching valve including an axially movable spool, the spool selectively assuming a first position to feed the low clutch with the first output pressure when the engagement of the low clutch brings about a higher gear position that needs a smaller torque contribution, and a second position to feed the low clutch with the second output pressure when the engagement of the low clutch brings about a lower gear position that needs a larger torque contribution; and a second hydraulic section that comprises a first part that applies a predetermined fail pressure to one end of the spool, the predetermined fail pressure being the same as the maximum value of the high clutch pressure that is applied to said high clutch when a higher gear position of D-range is needed, a second part that applies said high clutch pressure to the other end of the spool, and a biasing spring that applies a biasing force to the other end of the spool in a manner to assist the second part.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 2:
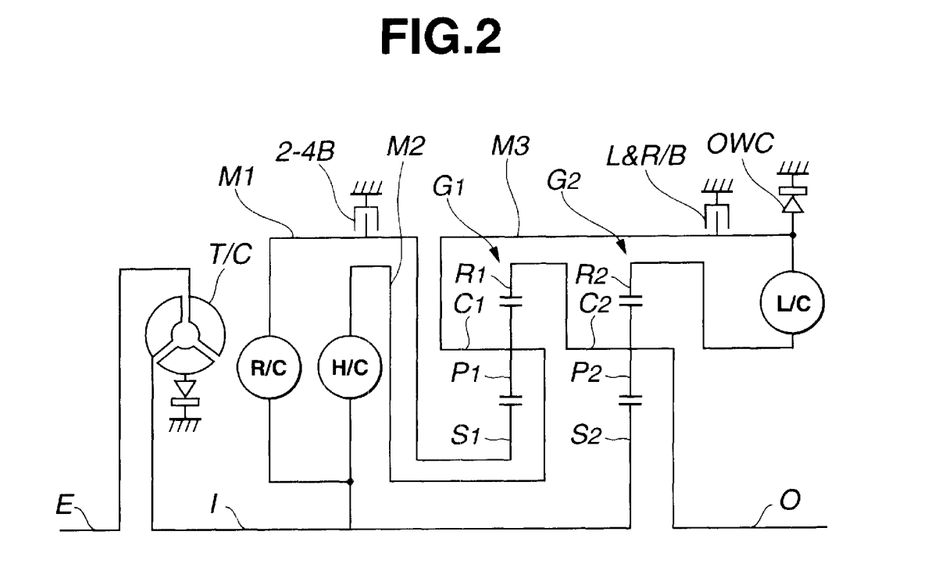
FIG. 2 is a gear train of an automotive transmission to which the hydraulic control system of the present invention is practically applied.

Referring to FIG. 2, there is shown a gear train of an automatic transmission to which a hydraulic control system of the present invention is applied.

In the drawing, denoted by "E" is an output shaft of an engine, "I" is an input shaft of the transmission and "O" is an output shaft of the transmission.

Between the engine output shaft "E" and the transmission input shaft "I", there is disposed a torque converter "T/C", and between the input and output shafts "I" and "O", there are arranged first and second planetary gear units "G1" and "G2".

The first planetary gear unit "G1" is of a simple type unit that comprises first pinions "P1", a first carrier "C1", a first sun gear "S1" and a first ring gear "R1", and the second planetary gear unit "G2" is also of a simple type unit that comprises second pinions "P2", a second carrier "C2", a second sun gear "S2" and a second ring gear "R2".

The transmission input shaft "I" and the second sun gear "S2" are directly connected to each other to rotate together. To a member "M1" by which the transmission input shaft "I" and the first sun gear "S1" are connected, there is mounted a reverse clutch "R/C". A 2-4 brake "2-4/B" of multi-disc type is provided, by which the member "M1" is selectively connectable to a case of the transmission. To a member "M2" by which the transmission input shaft "I" and the first carrier "C1" are connected, there is mounted a high clutch "H/C". To a member "M3" by which the first carrier "C1" and the second ring gear "R2" are connected, there is mounted a low clutch "L/C". A low-and-reverse brake "L&R/B" of multi-disc type is provided, by which the member M3 is selectively connectable to the case of the transmission. A one-way clutch "OWC" is provided in parallel with the low-and-reverse brake "L&R/B". The first ring gear "R1" and the second carrier "C2" are directly connected to rotate together. The second carrier "C2" is connected to the transmission output shaft "O" to rotate together.

Figure 3:
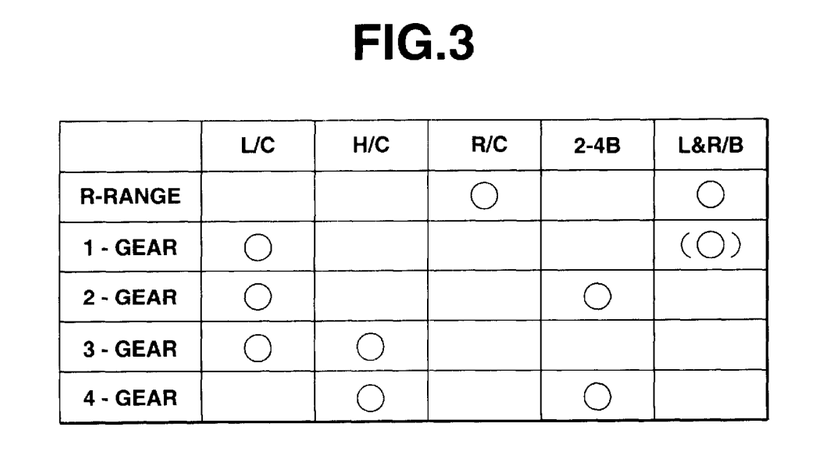
FIG. 3 is a table showing ON/OFF condition of various frictionally engaging elements of the transmission with respect to the gear position assumed by the transmission.

A table of FIG. 3 shows ON/OFF condition of the five engaging elements "L/C", "H/C", "R/C", "2-4/B" and "L&R/B" in Reverse range (R-range) and Drive range (D-range). Each circle in the table indicates ON (viz., engaged) condition of the corresponding engaging element, and the circle parenthesized indicates that the ON condition of the corresponding engaging element (L&R/B) does not participate in power transmission.

As is seen from this table, under R-range, the reverse clutch "R/C" and the low-and-reverse brake "L&R/B" are each engaged (ON). Under first gear of D-range, the low clutch "L/C" is engaged. Under this first gear, the low-and-reverse brake "L&R/B" is also engaged. However, this engagement does not participate in power transmission as has been mentioned hereinabove. Under second gear of D-range, the low clutch "L/C" and the 2-4 brake "2-4/B" are each engaged (ON). Under third gear of D-range, the low clutch "L/C" and the high clutch "H/C" are each engaged (ON), and under fourth gear of D-range, the high clutch "H/C" and 2-4 brake "2-4/B" are each engaged. Although not shown in the table, under first gear of HOLD mode of low-range (L-range), the low clutch "L/C" and the low-and-reverse brake "L&R/B" are each engaged.

Figure 4:
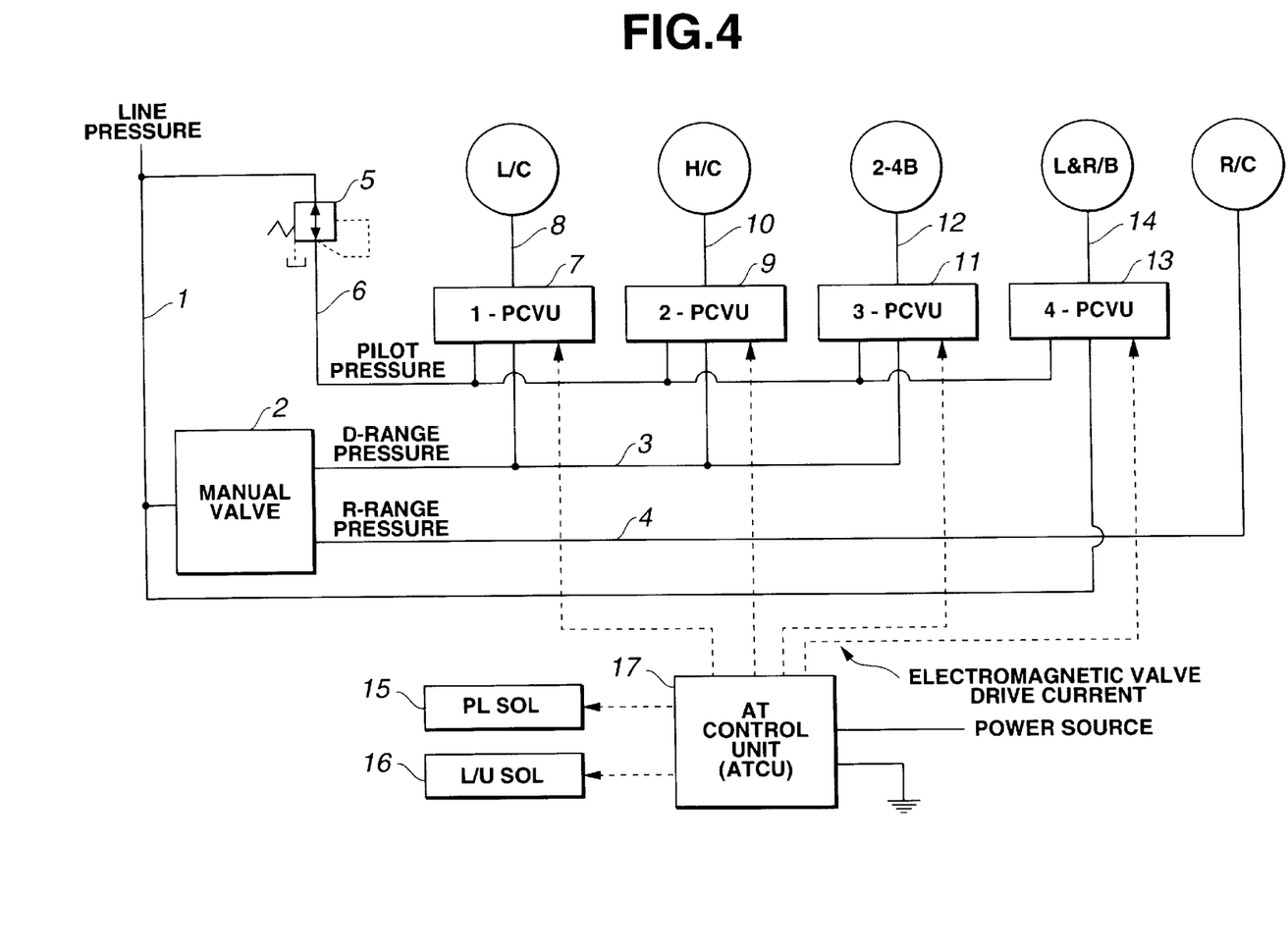
FIG. 4 is a schematic drawing of a hydraulic circuit of the transmission to which the present invention is applied.

FIG. 4 shows schematically a hydraulic circuit of the automatic transmission to which the invention is practically applied.

Denoted by reference 1 is a line pressure passage, 2 is a manual valve, 3 is a D-range pressure passage and 4 is a R-range pressure passage. The manual valve 2 is actuated by a manual shift operation, so that upon selection of D-range, the line pressure passage 1 and the D-range pressure passage 3 are connected, and upon selection of R-range, the line pressure passage 1 and the R-range pressure passage 4 are connected.

Denoted by numeral 5 is a pilot valve, and 6 is a pilot pressure passage. The pilot valve 5 functions to reduce or control the line pressure from the line pressure passage 1 to a constant pilot pressure.

Denoted by numeral 7 is a first pressure control valve unit which, under control of the pilot pressure, produces a low clutch pressure from the D-range pressure, the lower clutch pressure being fed through a low clutch pressure passage 8 to the low clutch "L/C". The first pressure control valve unit 7 comprises a first low clutch amp-valve 32 (see FIG. 6), a second low clutch amp-valve 33 (see FIG. 6), a 2-4 brake fail-safe valve 34 (see FIG. 6) and a low clutch solenoid 27 of duty control type (see FIGS. 5 and 6).

Denoted by numeral 9 is a second pressure control valve unit which, under control of the pilot pressure, produces a high clutch pressure from the D-range pressure, the high clutch pressure being fed through a high clutch pressure passage 10 to the high clutch "H/C". The second pressure control valve unit 9 comprises a high clutch amp-valve and a high clutch solenoid 28 of duty control type (see FIG. 5).

Denoted by numeral 11 is a third pressure control valve unit, which, under control of the pilot pressure, produces a 2-4 brake pressure from the D-range pressure, the 2-4 brake pressure being fed through a 2-4 brake pressure passage 12 to the 2-4 brake "2-4/B". The third pressure control valve unit 11 comprises a 2-4 brake amp-valve and a 2-4 brake solenoid 29 of duty control type (see FIG. 5).

Denoted by numeral 13 is a fourth pressure control valve unit which, under control of the pilot pressure, produces a low-and-reverse brake pressure from the line pressure, the low-and-reverse brake pressure being fed through a low-and-reverse brake pressure passage 14 to the low-and-reverse brake "L&R/B". The fourth pressure control valve unit 13 comprises a low-and-reverse brake amp-valve a low-and-reverse brake solenoid 30 (see FIG. 5).

In the drawing of FIG. 4, denoted by numeral 15 is a pressure control solenoid of ON/OFF type, which changes the line pressure to higher and lower levels.

Denoted by numeral 16 is a lock-up solenoid of duty type, which controls ON/OFF operation of a lock-up clutch.

Denoted by numeral 17 is an automatic transmission control unit "ATCU" including a microprocessor, which, based on various information signals applied thereto, carries out various arithmetical operations including those of gear change control. In accordance with the result of the operations, the control unit 17 outputs solenoid drive current to each of the solenoids 15, 16, 27, 28, 29 and 30. As is known, the microprocessor generally comprises a central processing unit (CPU), a random access memory (RAM), a read only memory (ROM) and input and output interfaces.

Figure 5:
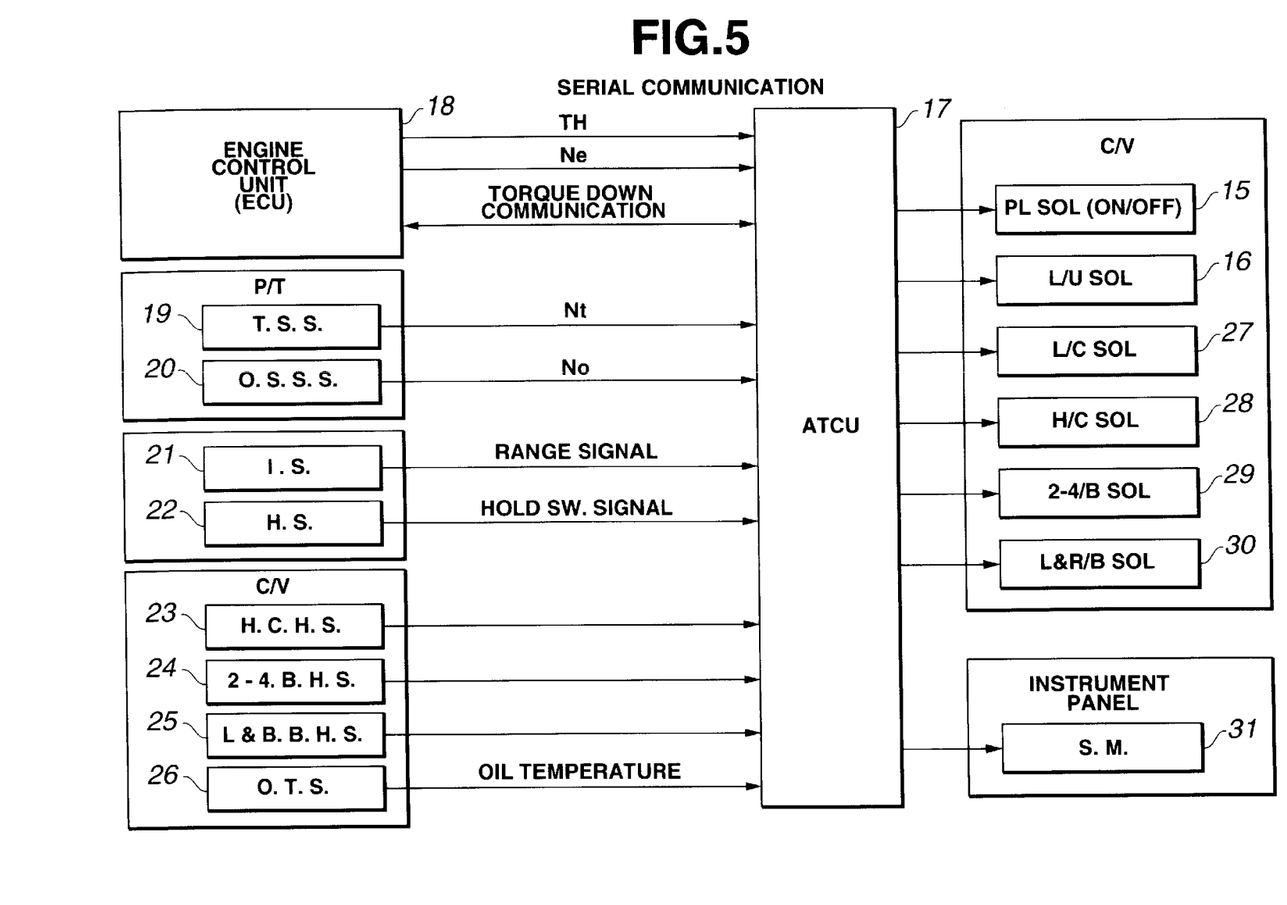
FIG. 5 is a block diagram of an electronic control system employed in the hydraulic control system of the present invention.

FIG. 5 shows an electronic control system employed in the hydraulic control system of the first embodiment. Denoted by numeral 18 is an engine control unit "ECU" which feeds by means of serial communication the automatic transmission control unit 17 with an information signal representing a throttle opening degree "TH" and an information signal representing an engine speed "Ne". Between these two control units 17 and 18, a so-called torque down communication is carried out.

In the power train "PT" of the transmission, there are installed a turbine speed sensor 19 and an output shaft speed sensor 20, which feed the control unit 17 with an information signal representing a turbine speed "Nt" of the torque converter "T/C" and an information signal representing a rotation speed "No" of the output shaft "O". From an inhibitor switch 21 and a hold switch 22, there are inputted into the control unit 17 a range signal and a hold switch signal respectively.

In a control valve unit "C/V" of the transmission, there are installed a high clutch hydraulic switch 23, a 2-4 brake hydraulic switch 24 and a low-and-reverse brake switch 25, which feed the control unit 17 with switch signals representing a pressure supply condition of the high clutch "H/C", that of the 2-4 brake "2-4/B" and that of the low-and-reverse brake "L&R/B". From an oil temperature sensor 26, there is inputted into the control unit 17 an information signal representing an oil temperature of the transmission.

By processing the information signals applied thereto, the automatic transmission control unit 17 issues instruction signals, Viz., solenoid drive current, to each of the pressure control solenoid 15, the lock-up solenoid 16, the low clutch solenoid 27, the high clutch solenoid 28, the 2-4 brake solenoid 29 and the low-and-reverse brake solenoid 30 (valve) which are also installed in the control valve unit "C/V". The control unit 17 issues a vehicle speed representing signal to a speed meter 31 mounted on an instrument panel.

Figure 1:
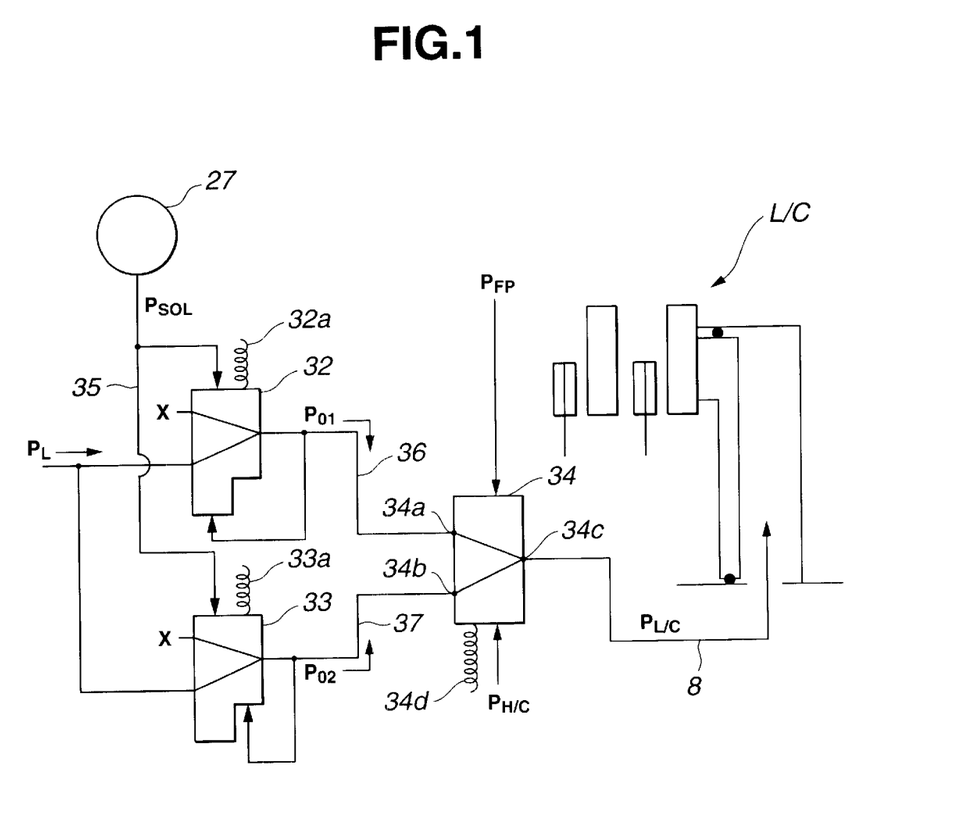
FIG. 1 is a schematic drawing of a hydraulic control system of an automotive automatic transmission, according to the present invention.
Figure 6:
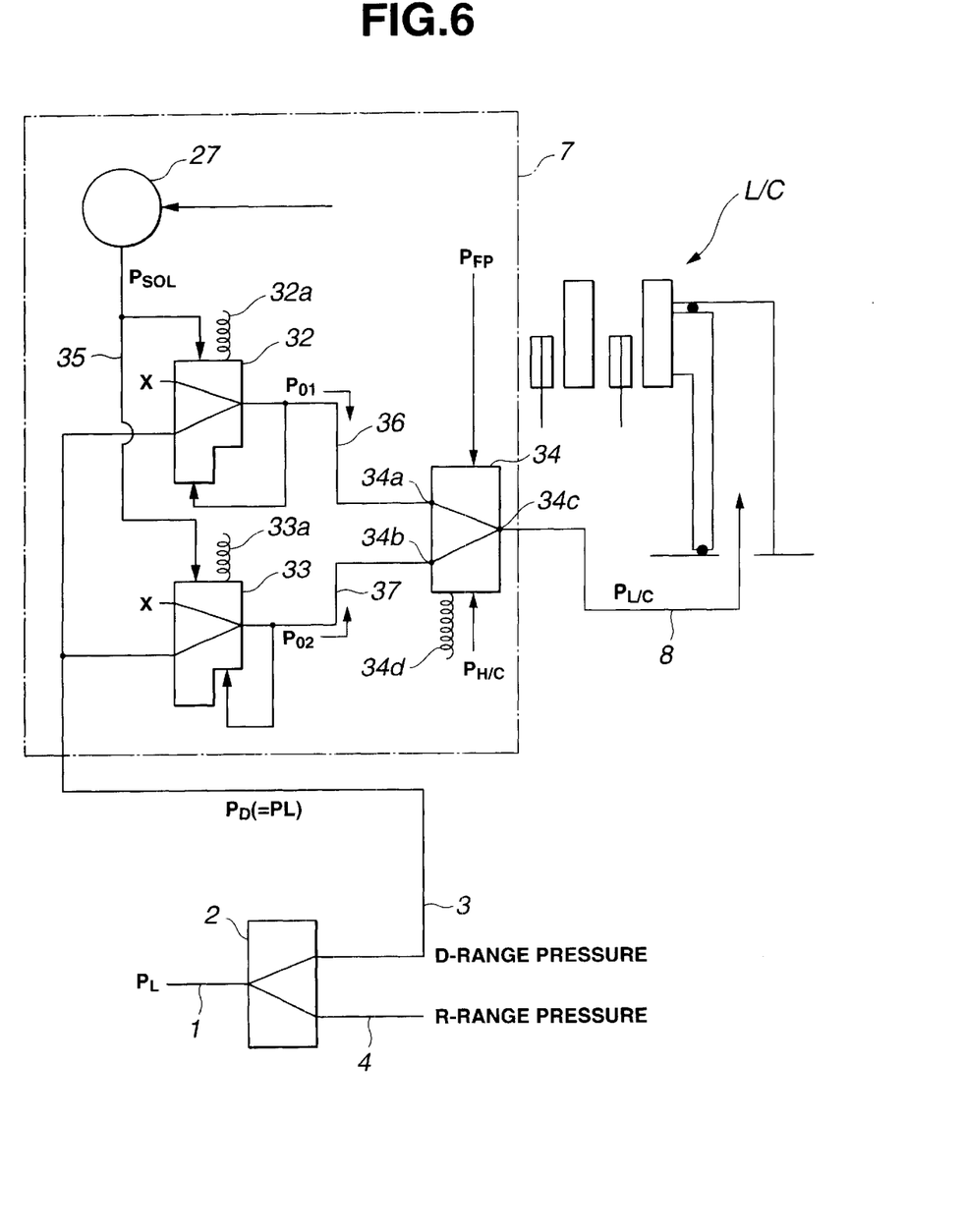
FIG. 6 is a hydraulic circuit for a low-clutch, to which the hydraulic control system of the invention is applied.

Referring to FIGS. 1 and 6, particularly FIG. 6, there is shown the detail of the hydraulic circuit for the low clutch "L/C", to which the hydraulic control system of the present invention is practically applied.

As has been mentioned in the section of FIG. 4, the first pressure control valve unit 7 is connected through the low clutch pressure passage 8 to the low clutch "L/C". The line pressure passage 1 is connected to the first pressure control valve unit 7 through the manual valve 2 and the D-range pressure passage 3.

The first pressure control valve unit 7 generally comprises the first low clutch amp-valve 32, the second low clutch amp-valve 33, the 2-4 brake fail-safe valve 34 and the low clutch solenoid 27. The line pressure "$P_L$" is fed to each of the first and second low clutch amp-valves 32 and 33. The solenoid pressure produced by the low clutch solenoid 27 is applied to both the first and second low clutch amp-valves 32 and 33 through a solenoid pressure passage 35, the output pressure from the first low clutch amp-valve 32 is led to a first inlet port 34a of the 2-4 brake fail-safe valve 34 through a first output pressure passage 36, and the output pressure from the second low clutch amp-valve 33 is led to a second inlet port 34b of the 2-4 brake fail-safe valve 34 through a second output pressure passage 37. The output pressure from the valve 32 or 33 is bed back to the valve 32 or 33. The arrangement of the first pressure control valve unit 7 will become much apparent from the following.

As shown, the first low clutch amp-valve 32 comprises a spool having axially opposed ends to which a solenoid pressure "$P_{SOL}$" from the low clutch solenoid 27 and an output pressure "$P_{01}$" of the valve 32 are applied respectively. A biasing spring 32a is applied to the spool in a manner to assist the solenoid pressure "$P_{SOL}$". Similar to this, the second low clutch amp-valve 33 comprises a spool having axially opposed ends to which the solenoid pressure "$P_{SOL}$" from the low clutch solenoid 27 and an output pressure "$P_{02}$" of the valve 33 are applied respectively.

For ease of description, the output pressures "$P_{01}$" and "$P_{02}$" from the first and second low clutch amp-valves 32 and 33 will be referred to first and-second output pressures "$P_{01}$" and "$P_{02}$", respectively.

A biasing spring 33a is applied to the spool in a manner to assist the solenoid pressure "$P_{SOL}$". That is, in these amp-valves 32 and 33, the solenoid pressure "$P_{SOL}$" and the biasing spring 32a or 33a are operated in a direction to increase the first or second output pressure "$P_{O1}$" or "$P_{O2}$", and the first or second output pressure "$P_{O1}$" or "$P_{O2}$", that is fed to back to the valve 32 or 33, is operated in a direction to reduce the output pressure "$P_{O1}$" or "$P_{O2}$". The first and second output pressures "$P_{O1}$" and "$P_{O2}$" from the first and second low clutch amp-valves 32 and 33 are led through the first and second output pressure passages 36 and 37 to first and second inlet ports 34a and 34b of the 2-4 brake fail-safe valve 34 respectively. To axially opposed ends of a spool of the fail-safe valve 34, there are applied a predetermined fail pressure "$P_{FP}$" and a high clutch pressure "$P_{H/C}$" respectively. A biasing spring 34d is applied to the spool in a manner to assist the high clutch pressure "$P_{H/C}$".

It is to be noted that the predetermined fail pressure "$P_{FP}$" is the same as the maximum high clutch pressure that is used at a higher gear position of D-range. The fail-safe valve 34 has an outlet port 34c connected to the low clutch pressure passage 8.

With the arrangement mentioned hereinabove, the first low clutch amp-valve 32 produces the first output pressure "$P_{O1}$" whose gain is small, and the second low clutch amp-valve 33 produces the second output pressure "$P_{O2}$" whose gain is large. Due to switching movement of the spool of the 2-4 brake fail-safe valve 34, one of the first and second output pressures "$P_{O1}$" and "$P_{O2}$" is led to the low clutch pressure passage 8 as a low clutch pressure "$P_{L/C}$" applied to the low clutch "L/C".

As will become apparent as the description proceeds, in a gear position that needs a larger torque contribution, the valve 34 assumes a second position to feed the second output pressure "$P_{O2}$" of the second low clutch amp-valve 33 to the low clutch "L/C", while, in a gear position that needs only a smaller torque contribution, the valve 34 assumes a first position to feed the first output pressure "$P_{O1}$" of the first low clutch amp-valve 32 to the low clutch "L/C". It is to be noted that setting of the pressure gain by each amp-valve 32 or 33 is made by adjusting the pressure receiving area thereof to which the first or second output pressure "$P_{O1}$" or "$P_{O2}$" of the valve 32 or 33 is applied.

As is seen from the table of FIG. 3, the low clutch "L/C" takes its engaged condition when the transmission assumes first, second or third gear position of D-range. While the high clutch "H/C" takes its engaged condition when the transmission assumes third or fourth gear position of D-range. It is to be noted that the high clutch pressure "$P_{H/C}$" for engaging the high clutch "H/C" is used as a switching pressure of the 2-4 brake fail-safe valve 34.

In the following, operation of the low clutch "L/C" controlled by the hydraulic control system of the invention will be described with reference to FIG. 6.

When there is no generation of the high clutch pressure "$P_{H/C}$", the 2-4 brake fail-safe valve 34 is forced to assume the second position connecting the second inlet port 34b with the outlet port 34c due to the force of the fail pressure "$P_{FP}$", while when there is generation of the high clutch pressure "$P_{H/C}$", the fail-safe valve 34 is forced to assume the first position connecting the first inlet port 34a with the outlet port 34c because the sum of the high clutch pressure "$P_{H/C}$" and the force of the biasing spring 34d exceeds the fail pressure "$P_{FP}$".

Accordingly, at the time of shifting from N-range to D-range when there is no generation of high clutch pressure "$P_{H/C}$", the second output pressure "$P_{O2}$" from the second low clutch amp-valve 33, that has a larger gain, serves as the low clutch pressure "$P_{L/C}$" applied to the low clutch "L/C". At the first or second gear position of D-range where there is no generation of high clutch pressure "$P_{H/C}$" (see FIG. 3), the second output pressure "$P_{O2}$" that shows a larger gain upon receiving the maximum solenoid pressure "$P_{SOL}$" serves as the low clutch pressure "$P_{L/C}$".

When, due to gear change from the second gear position to the third gear position of D-range, there becomes generated a lo high clutch pressure "$P_{H/C}$" (see FIG. 3), the following operation takes place. That is, in the gear change transition where the high clutch pressure "$P_{H/C}$" shows a lower level, the second output pressure "$P_{O2}$" serves as the low clutch pressure "$P_{L/C}$" keeping the engagement of the low clutch "L/C", and when, after completion of the gear change, the high clutch pressure "$P_{H/C}$" increases to a high level as the line pressure "$P_L$", the 2-4 brake fail-safe valve 34 is forced to switch to assume the first position connecting the first inlet port 34a with the outlet port 34c. Upon this, the first output pressure "$P_{O1}$" from the first low clutch amp-valve 32, that has a smaller gain, serves as the low clutch pressure "$P_{L/C}$" keeping the engagement of the low clutch "L/C".

When thereafter a shift-up is carried out from the third gear position to the fourth gear position of D-range, the decrease of the low clutch pressure "$P_{L/C}$" at the low clutch "L/C" is finely controlled based on the first output pressure "$P_{O1}$" that has a smaller gain. And when a shift-down is carried out from the fourth gear position to the third gear position of D-range, the increase of the low clutch pressure "$P_{L/C}$" at the low clutch "L/C" is finely controlled based on the first output pressure "$P_{O1}$".

Figure 7:
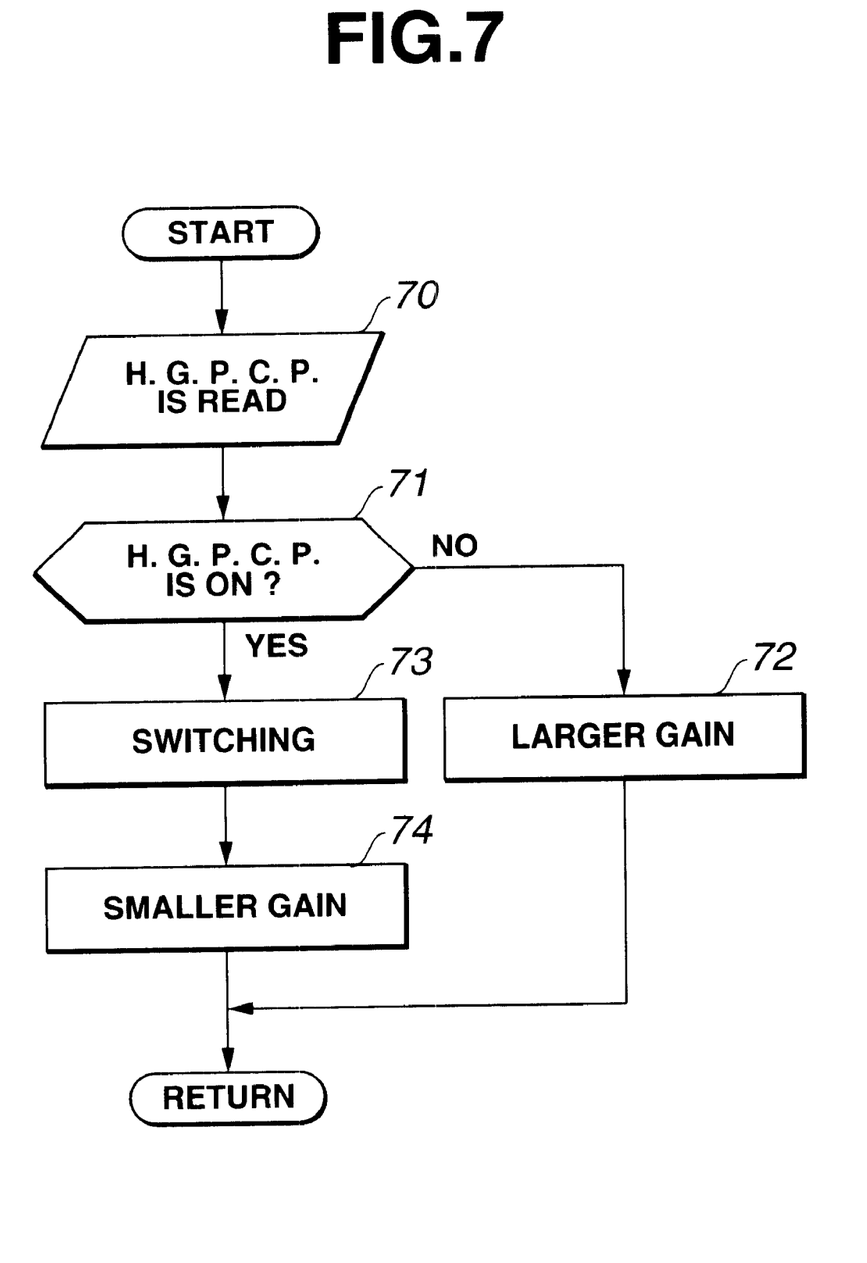
FIG. 7 is a flowchart showing programmed operation steps executed for controlling the hydraulic pressure applied to the low-clutch.

FIG. 7 is a flowchart showing operation steps executed for switching of the low clutch pressure "$P_{L/C}$".

At step S-70, a high gear position clutch pressure (viz., the high clutch pressure "$P_{H/C}$") is read, and at step S-71, a judgement is carried out as to whether the high gear position clutch pressure is NO or not, that is, whether the high clutch pressure "$P_{H/C}$" is generated or not. If NO, that is, when there is no generation of the high gear position clutch pressure, the operation flow goes to step S-72. With this, the operation of the clutch is controlled by a clutch pressure that has a larger gain. While, if YES at step 5-70, that is, when there is generation of the high gear position clutch pressure, the operation flow goes to step S-73 to cause switching of a switching valve (viz., the 2-4 brake fail-safe valve 34). Then, the operation flow goes to step S-74. With this, the operation of the clutch is controlled by the clutch pressure that has a smaller gain.

Figure 8:
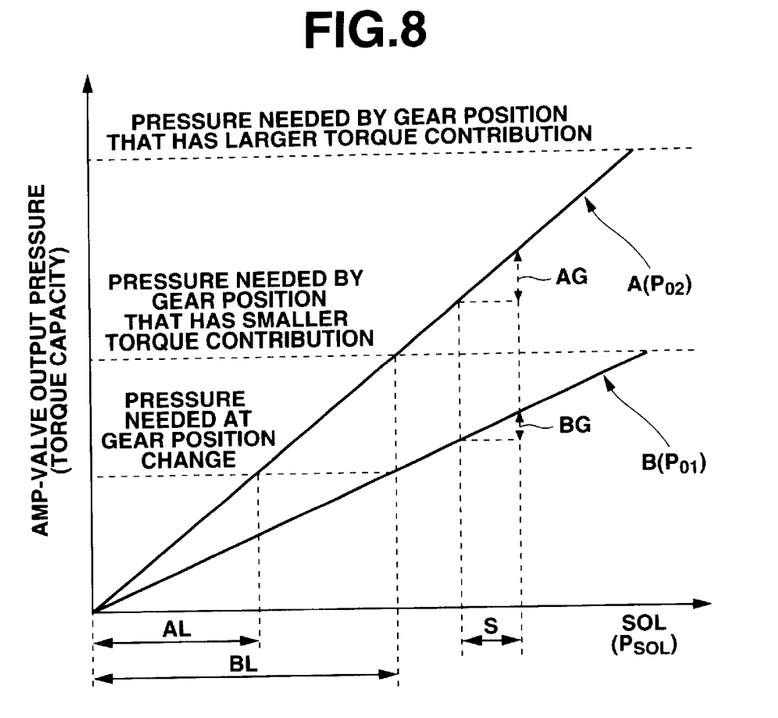
FIG. 8 is a graph showing both the output pressure characteristic of a first low-clutch amp valve and that of a second low-clutch amp valve, which are employed in the hydraulic control system of the present invention.

This unique operation will be much easily understood from the graph of FIG. 8 that depicts both the output pressure characteristic "B" of the first low-clutch amp valve 32 and that "A" of the second low-clutch amp valve 33. As is seen from the characteristic line "B" of this graph, the first output pressure "$P_{O1}$" from the first low clutch amp-valve 32 shows a smaller change (viz., gain) "BG" in output with respect to a predetermined change "S" in solenoid pressure "$P_{SOL}$", and the maximum value of this first output pressure "$P_{O1}$" is the value needed by a gear position that needs a smaller torque contribution. While, as is seen from the characteristic line "A" of the graph, the second output pressure "$P_{O2}$" from the second low clutch amp-valve 33 shows a larger change (viz., gain) "AG" in output with respect to the predetermined change "S" in solenoid pressure "$P_{SOL}$", and the maximum value of this second output pressure "$P_{O2}$" is the value needed by a gear position that needs a larger torque contribution. When making a comparison on the control range of the solenoid pressure "$P_{SOL}$" to the hydraulic pressure that is needed upon gear change, it becomes apparent that if the character "A" is selected, the control range "AL" shows a smaller value, while, if the character "B" is selected, the control range "BL" shows a larger value. This means that in order to obtain a finely and stably controlled gear change pressure, it is desirable to select the output pressure having the characteristic "B".

As is understood from the foregoing description, in the present invention, there are provided two, that is, first and second low clutch amp-valves 32 and 33 that issue respectively lower and higher gain output pressures "$P_{01}$" and "$P_{02}$". Due to work of the 2-4 brake fail-safe valve 34, these pressures "$P_{01}$" and "$P_{02}$" are selectively applied to the low clutch "L/C" in accordance with a torque contribution needed by the low clutch "L/C" when performing a given gear position. That is, due to function of the valve 34, in a gear position that needs a larger torque contribution, the higher gain output pressure "$P_{02}$" is fed to the low clutch "L/C", and in a gear position that needs only a smaller torque contribution, the lower gain output pressure "$P_{01}$" is fed to the low clutch "L/C". Accordingly, the torque capacity for the low clutch can be suitably controlled in accordance with the torque contribution actually needed by the low clutch when performing a given gear position. Furthermore, at a given gear position that needs decrease or increase of the low clutch pressure "$P_{L/C}$", the lower gain output pressure "$P_{01}$" is applied to the low clutch "L/C", and thus, a precise gear change control is carried out at the gear change.

The first and second output pressures "$P_{01}$" and "$P_{02}$" from the first and second low clutch arm-valves 32 and 33 are led to the first and second inlet ports 34a and 34b of the 2-4 brake failsafe valve 34 respectively. The outlet port 34c of the valve 34 is led to the low clutch "L/C" through the low clutch pressure passage 8. Thus, upon switching of the valve 34, either one of the first and second output pressures "$P_{01}$" and "$P_{02}$" is instantly applied to the low clutch "L/C".

The fail pressure "$P_{FP}$" is constantly applied to one end of the spool of the 2-4 brake fail-safe valve 34, and the high clutch pressure "$P_{H/C}$" is applied to the other end of the spool as an operation signal with the aid of the biasing spring 34d. The 2-4 brake fail-safe valve 34 having the above-mentioned construction has less parts than a conventional fail-safe valve of electromagnetic type, and thus, cost reduction is obtained in the present invention.

In the first and second low clutch amp-valves 32 and 33, the solenoid pressure "$P_{SOL}$" and the biasing spring 32a or 33a are operated in a direction to increase the first or second output pressure "$P_{01}$" or "$P_{02}$", and the first or second output pressure "$P_{01}$" or "$P_{02}$", that is fed to back to the valve 32 or 33, is operated in a direction to reduce the output pressure "$P_{01}$" or "$P_{02}$". Accordingly, upon application of the solenoid pressure "$P_{SOL}$" thereto, the valve 32 or 33 instantly produces the selected low clutch pressure "PL/C" (viz., output pressure "$P_{01}$" or "$P_{02}$") without producing a dead zone in that the low clutch pressure "$P_{L/C}$" is not produced even when the solenoid pressure "$P_{SOL}$" is generated.

The engaging element controlled by the first pressure control valve unit 7 is the low clutch "L/C" that assumes its engaged condition (viz., ON) at several lower gear positions (viz., first, second and third gear positions) of D-range. The 2-4 brake fail-safe valve 34 constitutes a valve that uses as its switching pressure the high clutch pressure "$P_{H/C}$" that is used for engaging the high clutch "H/C" at several higher gear positions (viz., third and fourth gear positions) of D-range. Accordingly, in the first or second gear position of D-range that needs a larger torque contribution, the higher gain second output pressure "$P_{02}$" is used as the low clutch pressure "$P_{L/C}$" and thus needed engaging torque capacity for the low clutch "L/C" in that gear position is obtained. While, in the third gear position of D-range that needs only a smaller torque contribution, the lower gain first output pressure "$P_{01}$" is used as the low clutch pressure "$P_{L/C}$" and thus needed engaging torque capacity for the low clutch "L/C" in that gear position is obtained. Furthermore, in up-shift from the third gear position to the fourth gear position and in down-shift from the fourth gear position to the third gear position, the gear change control pressure is finely and stably controlled based on the lower gain first output pressure "$P_{01}$".

Although the above description is directed to the example wherein the hydraulic control system of the invention is applied to the low clutch "L/C", the concept of the present invention may be applied to the low and reverse brake "L&R/B", the high clutch "H/C" or the 2-4 brake "2-4B". Furthermore, if desired, in place of the above-mentioned 2-4 brake fail-safe valve 34, an electromagnetic switching valve controlled in accordance with the steps of the flowchart of FIG. 7 may be used.

The entire contents of Japanese Patent Application P11-183836 (filed Jun. 29, 1999) are incorporated herein by reference.

Although the invention has been described above with reference to the embodiment of the invention, the invention is not limited to the embodiment described above. Various modifications and variations of the embodiment described above will occur to those skilled in the art, in light of the above teachings.

What is claimed is:

1. In an automatic transmission having a frictionally engaging element that is hydraulically actuated for assuming a plurality of gear positions, a hydraulic control system comprising:
 a first hydraulic section that produces a line pressure;
 a solenoid valve that produces a solenoid pressure upon receiving a solenoid signal;
 a first pressure control valve that produces a first output pressure from said line pressure by using said solenoid pressure and said first output pressure as operation signal pressures, said first output pressure having a smaller gain with respect to said solenoid pressure;
 a second pressure control valve that produces a second output pressure from said line pressure by using said solenoid pressure and said second output pressure as operation signal pressures, said second output pressure having a larger gain with respect to said solenoid pressure; and
 a switching valve that selectively assumes a first position to feed said engaging element with said first output pressure when the engagement of said engaging element brings about a higher gear position that needs a smaller torque contribution, and a second position to feed said engaging element with said second output pressure when the engagement of said engaging element brings about a lower gear position that needs a larger torque contribution.

2. A hydraulic control system as claimed in claim 1, in which said switch valve comprises:
 first and second inlet ports respectively connected to outlet ports of said first and second pressure control valves;
 an outlet port connected to said engaging element;
 a spool that axially moves to connect said outlet port to either one of said first and second inlet ports; and a second hydraulic section that axially moves said spool in accordance with the magnitude of a high clutch pressure applied to a high clutch.

3. A hydraulic control system as claimed in claim 2, in which said second hydraulic section comprises:

a first hydraulic part that applies a predetermined fail pressure to one end of said spool, said predetermined fail pressure being the same as the maximum value of the high clutch pressure that is applied to the high clutch when a higher gear position of D-range is needed;

a second hydraulic part that applies said high clutch pressure to the other end of said spool; and a biasing spring that applies a biasing force to the other end of said spool in a manner to assist said second hydraulic part.

4. A hydraulic control system as claimed in claim 1, in which each of said first and second pressure control valves comprises:

a spool that is axially movable;

a third hydraulic part that applies said solenoid pressure to one end of said spool;

a fourth hydraulic part that applies the corresponding output pressure of the first and second pressure control valves to the other end of said spool; and a biasing spring that biases said one end of said spool in a manner to assist said third hydraulic part.

5. A hydraulic control system as claimed in claim 1, in which said frictionally engaging element is a low clutch that assumes its engaged condition at a plurality of lower gear positions of D-range, and in which said switching valve uses, as a switching pressure, a high clutch pressure used for a high clutch that assumes its engaged condition at a plurality of higher gear positions of D-range.

6. In an automatic transmission having a low clutch that assumes its engaged condition at a plurality of lower gear positions of D-range and a high clutch that assumes its engaged condition at a plurality of higher gear positions of D-range, a hydraulic control system comprising:

a first hydraulic section that produces a line pressure;

a solenoid valve that produces a solenoid pressure upon receiving a solenoid signal;

a first pressure control valve that produces a first output pressure from said line pressure by using said solenoid pressure and said first output pressure as operation signal pressures, said first output pressure having a smaller gain with respect to said solenoid pressure;

a second pressure control valve that produces a second output pressure from said line pressure by using said solenoid pressure and said second output pressure as operation signal pressures, said second output pressure having a larger gain with respect to said solenoid pressure;

a switching valve including an axially movable spool, said spool selectively assuming a first position to feed said low clutch with said first output pressure when the engagement of said low clutch brings about a higher gear position that needs a smaller torque contribution, and a second position to feed said low clutch with said second output pressure when the engagement of said low clutch brings about a lower gear position that needs a larger torque contribution; and a second hydraulic section that comprises a first part that applies a predetermined fail pressure to one end of said spool, said predetermined fail pressure being the same as the maximum value of the high clutch pressure that is applied to said high clutch when a higher gear position of D-range is needed, a second part that applies said high clutch pressure to the other end of said spool, and a biasing spring that applies a biasing force to the other end of said spool in a manner to assist said second part.

* * * * *